April 29, 1969 A. H. SCHWING 3,441,806

PANEL BOARD WIRING CHANNEL WITH RIGIDLY FIXED SUPPORTS FOR TERMINAL STRIPS

Filed April 10, 1967

INVENTOR.

ALLAN H. SCHWING

BY Hoffman Stone

ATTORNEY

United States Patent Office 3,441,806
Patented Apr. 29, 1969

3,441,806

PANEL BOARD WIRING CHANNEL WITH RIGIDLY FIXED SUPPORT FOR TERMINAL STRIPS

Allan H. Schwing, 111 St. Regis Drive N., Rochester, N.Y. 14618

Filed Apr. 10, 1967, Ser. No. 629,777
Int. Cl. H02b *1/06, 9/00*
U.S. Cl. 317—122 3 Claims

ABSTRACT OF THE DISCLOSURE

A channel wiring assembly including a rigidly fixed support for terminal strips, control devices and the like extending centrally along the channel opposite from the base of the channel, and including laterally extending longitudinally spaced fingers shaped and positioned to cooperate with the free edges of the side walls of the channel for supporting and releasably securing a cover panel between the free ends of the fingers and the side walls of the channel.

*Brief summary of the invention*

This invention relates to a novel channel wiring assembly of the general type widely used in electrical control panels, and, more particularly, to a novel arrangement wherein the terminal strips and control devices may be positioned in generally axial alignment with the wiring channels rather than laterally offset from them, thereby achieving a relatively compact construction and facilitating its assembly.

Channel wiring for electrical control panels is in wide use. Wiring systems of this type generally include an array of channel members, each of which has a flat continuous base wall and a pair of side walls integral with the base and forming therewith a channel of generally U-shaped cross section. The side walls are slotted to give the appearance of being constituted by plural, longitudinally spaced fingers, each of which terminates in a laterally projecting flange for engaging the mating flange of a cover plate. Wires are laid in the channel and brought out through the slots between the fingers of the side walls to terminals that heretofore have been mounted directly on the same board to which the channels are secured and laterally spaced from the channels. The arrangement tends to be bulky, because the board must be large enough not only to accommodate the channels and the auxiliary components such as terminal strips, relays, and transducers, but also to enable access to the terminals of the auxiliary components. Such components must be spaced away from the channels, and the enclosure must be large enough so that its side walls do not unduly hinder access to terminals near the edges of the panel. In practice, for example, it has been found necessary to select enclosures that are larger than required by equipment considerations alone in order to provide working space for connecting the wires at points close to the side walls.

Briefly, a more compact arrangement is achieved in the practice of the present invention by providing a support which is rigidly fixed along the side of the channel that is open during assembly. Terminal strips and other components of the system, which were heretofore mounted directly upon the panel itself, are mounted upon the support. Wires from the channels are then trained in a direction away from the base of the channel to connect with the devices on the support. The support is narrower than the channel and carries laterally extending flange-tipped fingers for supporting cover members between the ends of the fingers and the outer edges of the side walls of the channel.

The arrangement is more compact than arrangements heretofore used with this type of channel wiring because components heretofore mounted directly on the panel laterally spaced from the channels are carried in directly opposed relationship to the base walls of the channels. Moreover, assembly is very much facilitated because the terminal points for the wires are not down at the bottom of the enclosure, but are up on top of the assembly where they are very readily accessible to the wirer.

*Detailed description*

A presently preferred embodiment of the invention will now be described in connection with the accompanying drawing, wherein.

Figure 1:
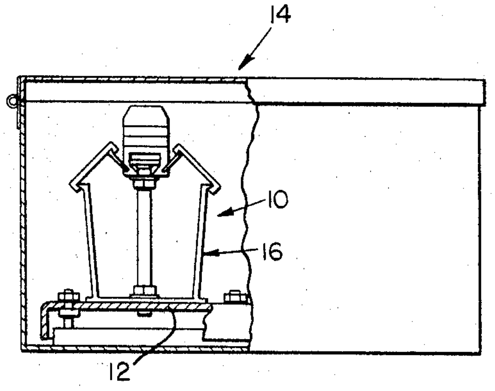
FIGURE 1 is a partly schematic end view of a box enclosing a channel wired panel, showing the box with an end wall partly broken away to present an end view of one channel assembly in accordance with the invention, but with the wires omitted.
Figure 2:
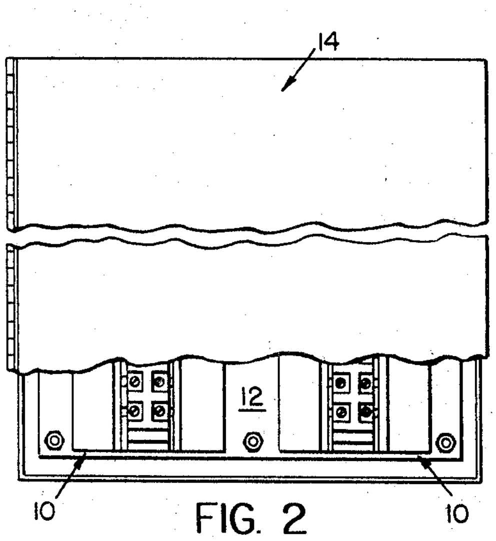
FIGURE 2 is a plan view of the electrical enclosure shown in FIGURE 1.
Figure 3:
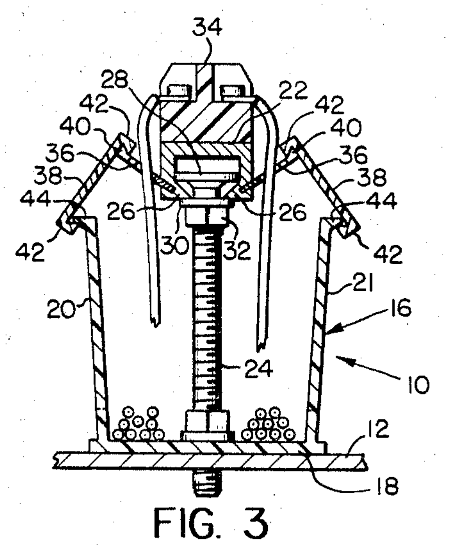
FIGURE 3 is a cross-sectional view of a channel assembly of the invention, showing wiring partly in place.
Figure 4:
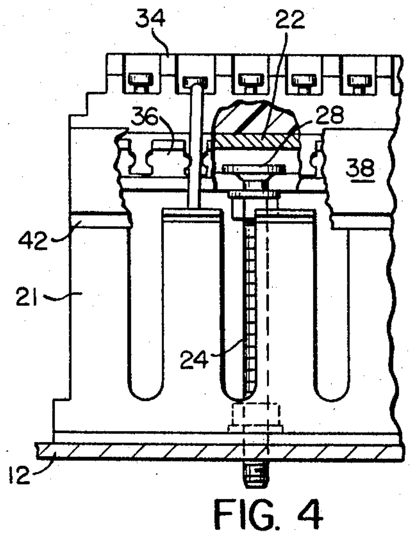
FIGURE 4 is a side elevational view of the channel assembly shown in FIGURE 3.
Figure 5:
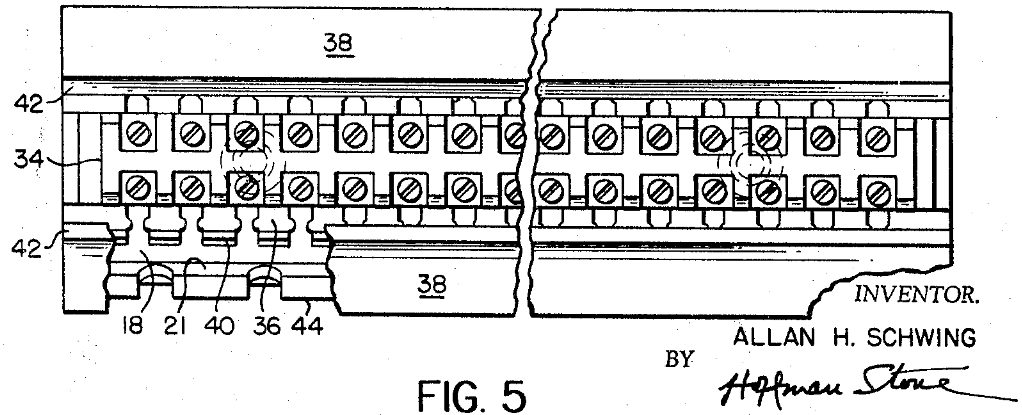
FIGURE 5 is a plan view of the assembly shown in FIGURES 3 and 4.

As shown, the channel structure 10 is mounted on a main board 12 along with as many other components (not shown) of the assembly as desired in accordance with the designer's choice. The board 12 is mounted upon the bottom wall of a conventional enclosure 14, a NEMA type 12 panel enclosure being shown by way of example. The basic channel unit 16 illustrated is conventional, and includes a base wall 18 and slotted side walls 20 and 21 arranged to form a duct-like channel generally U-shaped in cross section. The channel 16 is typically made of an insulating material such as a thermoplastic resin. The side walls 20 and 21 are slotted to provide ports through which wires may be laid for connection to points on the board 12 lying outside of the channel 16. The base wall 18 of the channel is ordinarily secured flat upon the board 12 as shown.

In accordance with the invention, a rigid, relatively narrow support member 22 is mounted centrally along the channel 16 fairly close to the plane defined by the outer, or upper edges of the side walls 20 and 21. The support member 22 in the preferred form of the invention is an extrusion, typically of aluminum, of generally C-shaped cross section. It is mounted upon studs 24 which are securely fixed to the main board 12. The lips 26, or inwardly extending flanges of the support member 22 are clamped between terminal flanges 28 at the outer ends of the studs and washers 30, which are driven against the flanges 26 by nuts 32 threaded on the studs. Two or more of the studs 24 are mounted centrally along each channel 16, and the support member 22 is simply slid upon the studs over the terminal flanges 28 and then permanently but removably secured by tightening the nuts 32.

Any desired circuit components may be mounted on the support member 22 such as, for example, the terminal strips 34 illustrated.

Laterally extending fingers 36 are fixed to the support member 12 for supporting cover plates 38. The fingers 36 are preferably of plastic material and extend laterally and outwardly from the support member 22. They carry flanges 40 at their outer ends for engaging mating reentrant flanges 42 of conventional cover plates 38, the opposite flanges of which are engaged by the flanges 44 that terminate the end, or outer edges of the side walls 20 and 21.

The cover plates 38 are normally removed during wiring of the panel and are snapped into place only after wiring is completed.

The arrangement permits use of smaller panels and enclosures than heretofore because panel space is not needed for the components mounted on the support member 22, and the channels 16 may be placed relatively close to the side walls of the enclosure 14. And, more importantly, the arrangement facilitates the securing of wires to the terminals because the terminals are positioned in a region of maximum accessibility.

What is claimed is:

1. In an electrical channel wiring arrangement of the kind including a mounting board, and a duct-like channel member of generally U-shaped cross section fixed to the board with its open side facing away from the board, the improvement comprising an elongated rigid support member narrower in width than the open side of the channel member for supporting components of the wiring system, and means for securing said support member along the open side of the channel member so that the terminals of components supported on said support member stand farther from the mounting board than the plane of the open side of the channel member, the outer ends of the side walls of the channel member being spaced from said support member to allow wiring to be laid in the channel member without hindrance.

2. In an electrical channel wiring arrangement of the kind including a mounting board, and a duct-like channel member of generally U-shaped cross section fixed to the board with its open side facing away from the board, the improvement comprising an elongated rigid support member narrower in width than the open side of the channel member for supporting components of the wiring system, and means for securing said support member centrally of the channel member along the open side thereof so that the terminals of components supported on said support member stand farther from the mounting board than the plane of the open side of the channel member, said securing means including a pair of posts rigidly secured at one end to the mounting board in approximate alignment with the central lengthwise axis of the channel member, the outer ends of the side walls of the channel member being spaced from said support member to allow wiring to be laid in the channel member without hindrance.

3. In an electrical channel wiring arrangement of the kind including a mounting board, and a duct-like channel member of generally U-shaped cross section fixed to the board with the open side facing away from the board, the improvement comprising an elongated rigid support member narrower in width than the channel member for supporting components of the wiring systems, means for securing said support member centrally of the channel member along the open side thereof so that the terminals of components supported on said support member stand farther from the mounting board than the plane of the open side of the channel member, and laterally projecting fingers on said support member for securing a cover plate between said fingers and the side walls of the channel member.

References Cited

UNITED STATES PATENTS 3,321,571 5/1967 Lynch.
3,363,050 1/1968 Martin.

FOREIGN PATENTS 972,773 10/1964 Great Britain.

OTHER REFERENCES

Van Gennip, Netherlands printed application, No. 297, 751, published Nov. 10, 1965.

LEWIS H. MYERS, *Primary Examiner.*

J. R. SCOTT, *Assistant Examiner.*

U.S. Cl. X.R.

174—72